US009030107B2

(12) United States Patent
Ido (10) Patent No.: US 9,030,107 B2
(45) Date of Patent: May 12, 2015

(54) ILLUMINATION APPARATUS

(75) Inventor: Shigeru Ido, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 152 days.

(21) Appl. No.: 13/416,072

(22) Filed: Mar. 9, 2012

(65) Prior Publication Data

US 2012/0235582 A1    Sep. 20, 2012

(30) Foreign Application Priority Data

Mar. 16, 2011    (JP) ................................. 2011-057985

(51) Int. Cl.
H05B 37/02    (2006.01)
H05B 33/08    (2006.01)

(52) U.S. Cl.
CPC ........ *H05B 33/0827* (2013.01); *H05B 33/0815* (2013.01); *Y02B 20/347* (2013.01)

(58) Field of Classification Search
CPC ........... H05B 41/2828; H05B 41/2858; H05B 33/0878; H05B 41/3924; H05B 41/392; H05B 41/36; H02H 3/025; H02H 3/023; H02M 1/34
USPC .......... 315/185 R, 186, 194, 200 R, 224, 225, 315/291, 307, 308
See application file for complete search history.

(56) References Cited

U.S. PATENT DOCUMENTS

| | | | |
|---|---|---|---|
| 2009/0212721 A1* | 8/2009 | Maruyama | 315/307 |
| 2010/0225251 A1* | 9/2010 | Maruyama | 315/307 |
| 2010/0277067 A1 | 11/2010 | Maxik et al. | |
| 2011/0057564 A1 | 3/2011 | Otake | |
| 2011/0248640 A1* | 10/2011 | Welten | 315/210 |

FOREIGN PATENT DOCUMENTS

| | | |
|---|---|---|
| JP | 2009-200257 | 9/2009 |
| WO | 2010/027254 | 3/2010 |

\* cited by examiner

*Primary Examiner* — Douglas W Owens
*Assistant Examiner* — Thai Pham
(74) *Attorney, Agent, or Firm* — Bacon & Thomas, PLLC (57) ABSTRACT

An illumination apparatus includes: a series circuit of a thyristor and at least one load circuit connected across an AC power source; a current control circuit for adjusting an input current to be maintained at a predetermined level during a part or the whole of an ON period of the thyristor; and a short circuit for short-circuiting input ports of the load circuit to have a predetermined resistance during a part of the ON period of the thyristor and a part or the whole of an OFF period of the thyristor. The current control circuit and the short circuit are connected in parallel to the load circuit.

5 Claims, 6 Drawing Sheets

ILLUMINATION APPARATUS

FIELD OF THE INVENTION

The present invention relates to an illumination apparatus including a bidirectional thyristor (triac) for a dimming function.

BACKGROUND OF THE INVENTION

Conventionally, there has been disclosed an illumination apparatus which includes a constant current circuit employed for supplying a constant current to an LED (light emitting diode); and a phase angle control circuit for adjusting a firing angle of a triac wherein the LED, the constant current circuit and the triac are connected in series (see, e.g., Japanese Patent Application Publication No. 2009-200257 (JP2009-200257A), FIG. 1 and claim 1).

The illumination apparatus disclosed in JP2009-200257A is capable of dimming control and can prevent a current larger than a predetermined level from flowing through the LED even when a power source voltage is varied, for example. Conventionally, there has been employed a dimming operation of an incandescent bulb performed by the triac. The dimming control can be realized merely by replacing an existing wall-installed switch with a dimmer having the triac. The incandescent bulb, however, tends to be replaced recently with an LED lamp, which may cause a malfunction in the dimmer having the triac.

When the dimmer having the triac malfunctions, it may be difficult to maintain an ON state of the triac and, resultantly, the triac may become turned off. This is because ah output current from the triac drops below a holding current needed for maintaining the ON state of the triac.

The reasons for the malfunctions of the triac may be described as follows. First, since a power consumed by an LED lamp is small, the output current from the triac can become easily smaller than the holding current of the triac. Second, due to a circuit configuration of the LED lamp, an input current becomes discontinuous and reduced to become smaller than the holding current of the triac, whereby the triac is turned off.

For these reasons, a current dividing circuit including a resistor may need to be provided in the LED lamp in order to increase the current flowing through the LED lamp to be greater than the holding current of the triac, or a power factor improving circuit or a dither rectifying circuit needs to be provided in order to prevent the input current from being discontinuous. Alternatively, the operation of the triac may be stabilized by providing a resistor or an incandescent bulb which is connected to the load in parallel.

In brief, it is possible to prevent the triac from malfunctioning by designing the load current to be greater than the holding current of the triac. However, when a current dividing circuit including a resistor is provided in the LED lamp to increase the LED lamp current to be greater than the current of the triac, stresses are generated in circuit elements due to heat produced from the resistor of the current dividing circuit.

In the meantime, to meet a demand for decrease in size and manufacturing cost of the LED lamp, attempts have been made to simplify a heat dissipation structure or a circuit. However, if heat is generated in the current dividing circuit for preventing the malfunction of the triac, it becomes difficult to reduce the size and the cost of the LED lamp.

Further, when the power factor improving circuit is provided in the LED lamp, the cost of the LED lamp increases and it becomes difficult to scale down the LED lamp. In addition, when a resistor is connected to the load in parallel, the LED lamp may malfunction due to fluctuation of the input voltage. This results when a voltage from a commercial power source is low, causing a current flowing through the resistor to be reduced. For that reason, the resistor may be designed to have a small resistance. This, however, increases power loss when a higher power source voltage is supplied.

SUMMARY OF THE INVENTION

In view of the above, the present invention provides an illumination apparatus capable of reducing both a standby power and a manufacturing cost.

In accordance with an embodiment of the present invention, there is provided an illumination apparatus including a series circuit of a thyristor and at least one load circuit connected across an AC power source; a current control circuit for adjusting an input current to be maintained at a predetermined level during a part or the whole of an ON period of the thyristor; and a short circuit for short-circuiting input ports of the load circuit to have a predetermined resistance during a part of the ON period of the thyristor and a part or the whole of an OFF period of the thyristor. The current control circuit and the short circuit are connected in parallel to the load circuit.

The input current of the current control circuit may be adjusted stepwise depending on a voltage of the AC power source during the ON period of the thyristor.

The illumination apparatus may further include a load current detecting unit for detecting an input current of said at least one load circuit. A current setting value of the current control circuit is adjusted in stages depending on a detected result of the load current detecting unit.

The current setting value of the current control circuit may be adjusted by an input current of the short circuit detected by the load current detecting unit.

When it is detected that an off period ratio of the thyristor is equal to or smaller than a predetermined value, the operations of the current control circuit and the short circuit may be stopped.

Operations of the current control circuit and the short circuit may be controlled based on a gate driving type of the thyristor determined by a current of the short circuit.

In accordance with the embodiment of the present invention, it is possible to provide an illumination apparatus capable of reducing both a standby power and a manufacturing cost.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Embodiments of the present invention will now be described with reference to the accompanying drawings which form a part hereof.

First Embodiment

Figure 1:
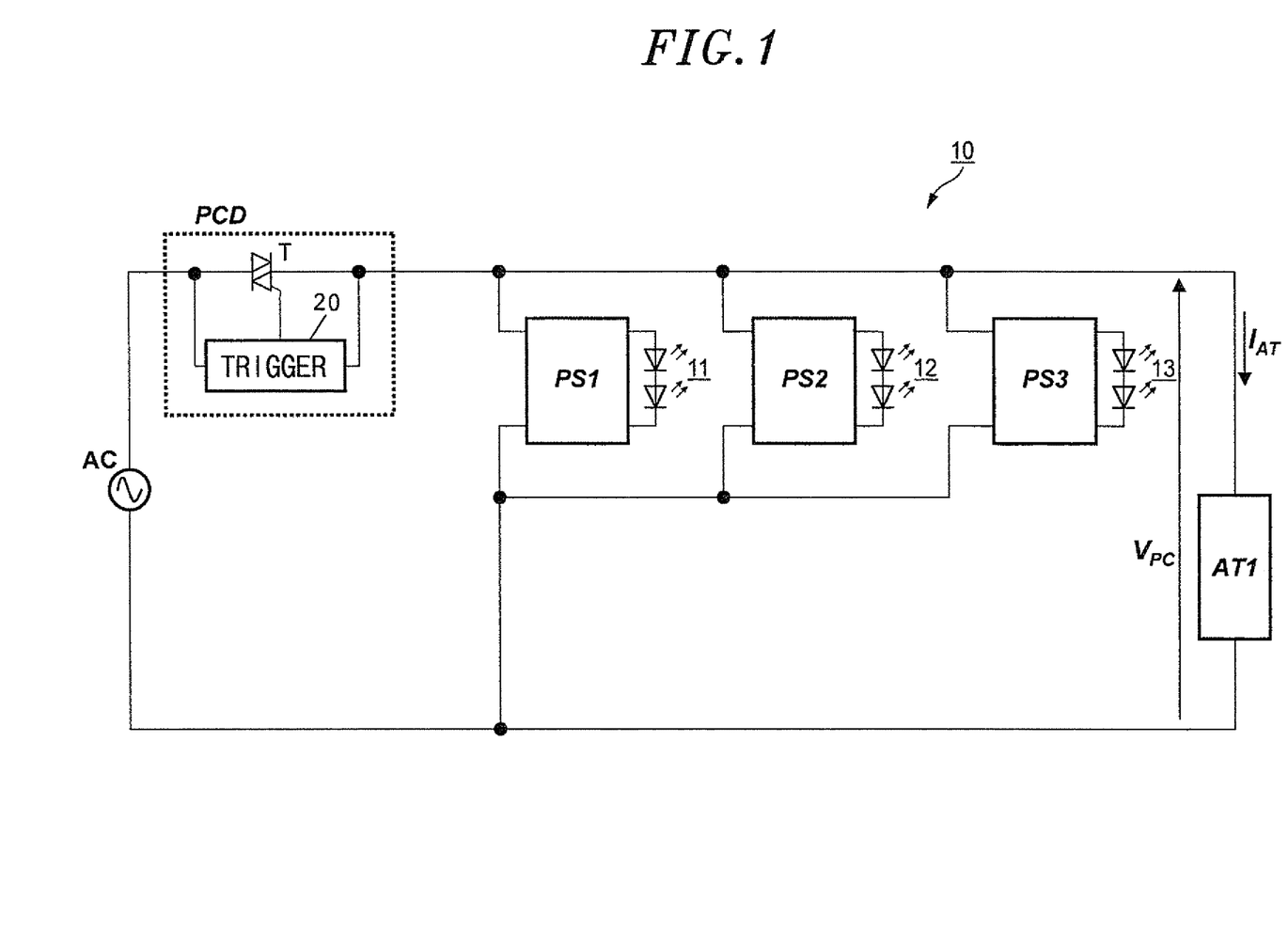
FIG. 1 is a block diagram showing an illumination device in accordance with a first embodiment of the present invention.

As shown in FIG. 1, an illumination apparatus 10 in accordance with a first embodiment of the present invention includes a series circuit of a current adjusting circuit AT1 and a triac dimmer PCD connected to two terminals of an AC power source AC. The illumination apparatus 10 further includes a parallel circuit connected to the triac dimmer PCD in series, the parallel circuit including a first load circuit PS1 connected to a plurality of LEDs 11; a second load circuit PS2 connected to a plurality of LEDs 12; and a third load circuit PS3 connected to a plurality of LEDs 13. The current adjusting circuit AT1 is connected in parallel to the load circuits PS1, PS2 and PS3.

The triac dimmer PCD having a triac T and a trigger 20 supplying a trigger current corresponding to an input, e.g., from a dimming control knob (not shown) is synchronized with the AC power source AC, and the trigger current is supplied from the trigger 20 to the triac T at a controlled phase angle so as to vary the voltage that is applied to the load circuits PS1, PS2 and PS3. The load circuits PS1, PS2 and PS3 respectively vary powers depending on applied voltages from the triac dimmer PCD and supply the powers to the LEDs 11, 12 and 13. A voltage $V_{PC}$ is applied to each of the load circuit PS1, PS2 and PS3, and an input current $I_{AT}$ is applied to the current adjusting circuit AT1.

As such, in the illumination apparatus 10, the current adjusting circuit AT1 is connected in parallel to the load circuits PS1, PS2 and PS3. Further, in the illumination apparatus 10, two thyristors reversely connected in parallel may be used instead of the triac T.

Figure 2:
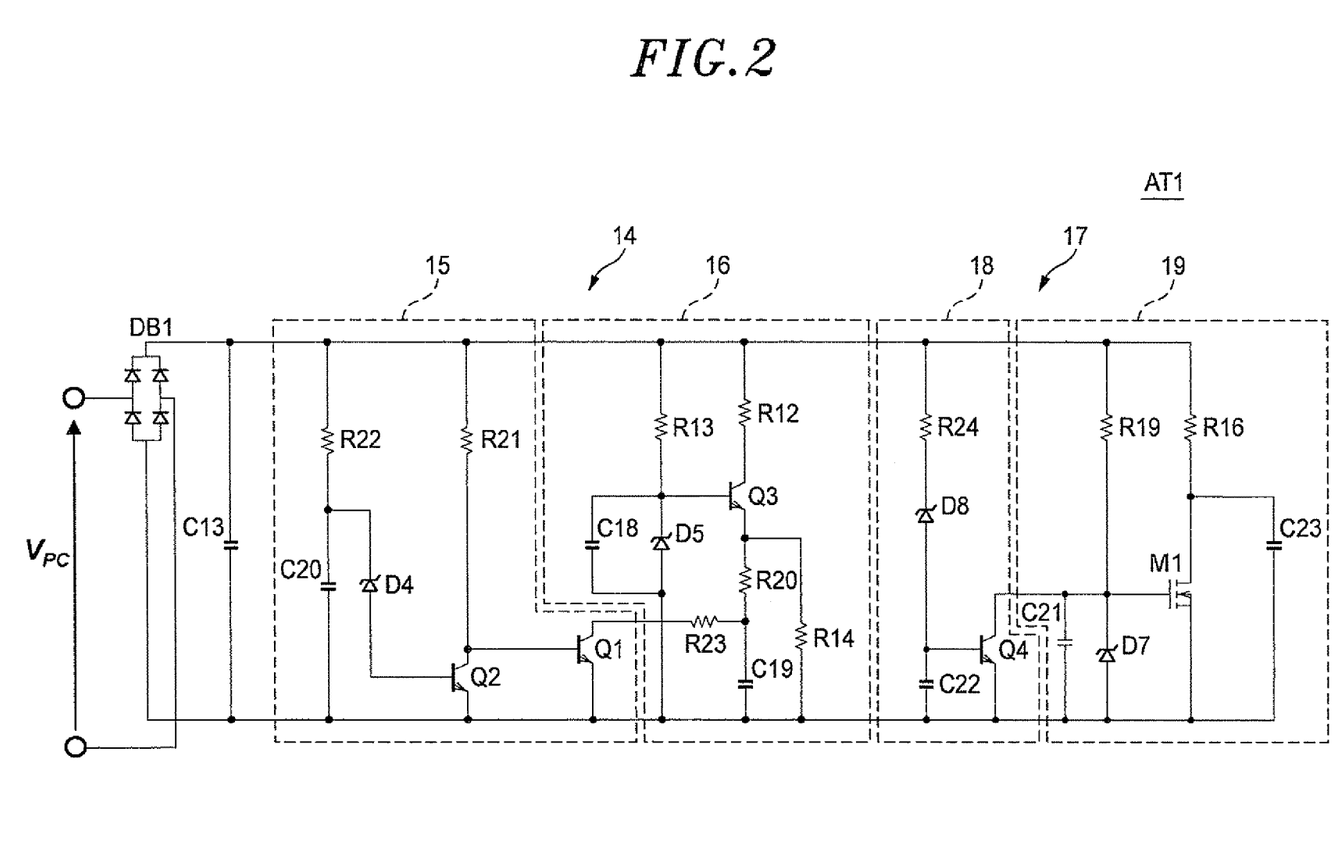
FIG. 2 is a circuit diagram showing a current adjusting circuit of the illumination apparatus of the first embodiment.

As shown in FIG. 2, the current adjusting circuit AT1 includes a diode bridge DB1; a capacitor C13; a current control circuit 14 having a constant current switch circuit 15 and a constant current circuit 16; and a short circuit 17 having a resistor short-circuiting control circuit 18 and a resistor short-circuiting switch circuit 19.

The constant current switch circuit 15 includes a resistor R22; a capacitor C20; a zener diode D4; transistor Q2; a resistor R21; and a transistor Q1. In the constant current switch circuit 15, if a magnitude of the voltage $V_{PC}$ is equal to or greater than the zener voltage of the zener diode D4, the transistor Q2 is turned on and, accordingly, the transistor Q1 is turned off. That is, the constant current switch circuit 15 serves to adjust a current level of the constant current circuit 16 depending on whether the transistor Q1 is turned on or off.

The constant current circuit 16 includes a resistor R13; a capacitor C18; a zener diode D5; a transistor Q3; resistors R12, R23, R14 and R20; and a capacitor C19. In the constant current circuit 16, a base voltage of the transistor Q3 is made substantially constant by the resistor R13 and the zener diode D5, thereby making an emitter voltage of the transistor Q3 constant. As a result, the constant current circuit 16 serves to make a current of the resistor R14 constant.

When the transistor Q1 of the constant current switch circuit 15 is turned on, a current flows through the resistor R20. Thus, a combined current of currents flowing through the resistors R14 and R20 flows through the resistor R12. Therefore, the current flowing through the resistor R12 is adjusted depending on whether the transistor Q1 is turned on or off. That is, the current flowing through the resistor R12 is increased when the transistor Q1 is turned on and decreased when the transistor Q1 is turned off. The current is smoothly adjusted by the time constant of the resistor R20 and the capacitor C19 when the transistor Q1 is turned off from an on state, and by the time constant of the resistor R23 and the capacitor C19 when the transistor Q1 is turned on from an off state.

The resistor short-circuiting control circuit 18 includes a resistor 24; a zener diode D8; a capacitor C22; and a transistor Q4. In the resistor short-circuiting control circuit 18, if the magnitude of the voltage $V_{PC}$ is equal to or greater than the zener voltage of the zener diode D8, the transistor Q4 is turned on and, accordingly, a MOSFET M1 of the resistor short-circuiting switch circuit 19 is turned off.

The resistor short-circuiting switch circuit 19 includes a capacitor C21; a zener diode D7; a resistor R19; the MOSFET M1; a resistor R16; and a capacitor C23. In the resistor short-circuiting switch circuit 19, the MOSFET M1 is biased by the resistor R19. When the transistor Q4 of the resistor short-circuiting control circuit 18 is turned off, the MOSFET M1 of the resistor short-circuiting switch circuit 19 is turned on so that a short-circuit current flows through the resistor R16. The zener diode D7 serves to restrict a gate-source voltage of the MOSFET M1. The capacitor C23 is a snubber element for reducing a stress by, e.g., absorbing a spike noise of the MOSFET M1.

Figure 3:
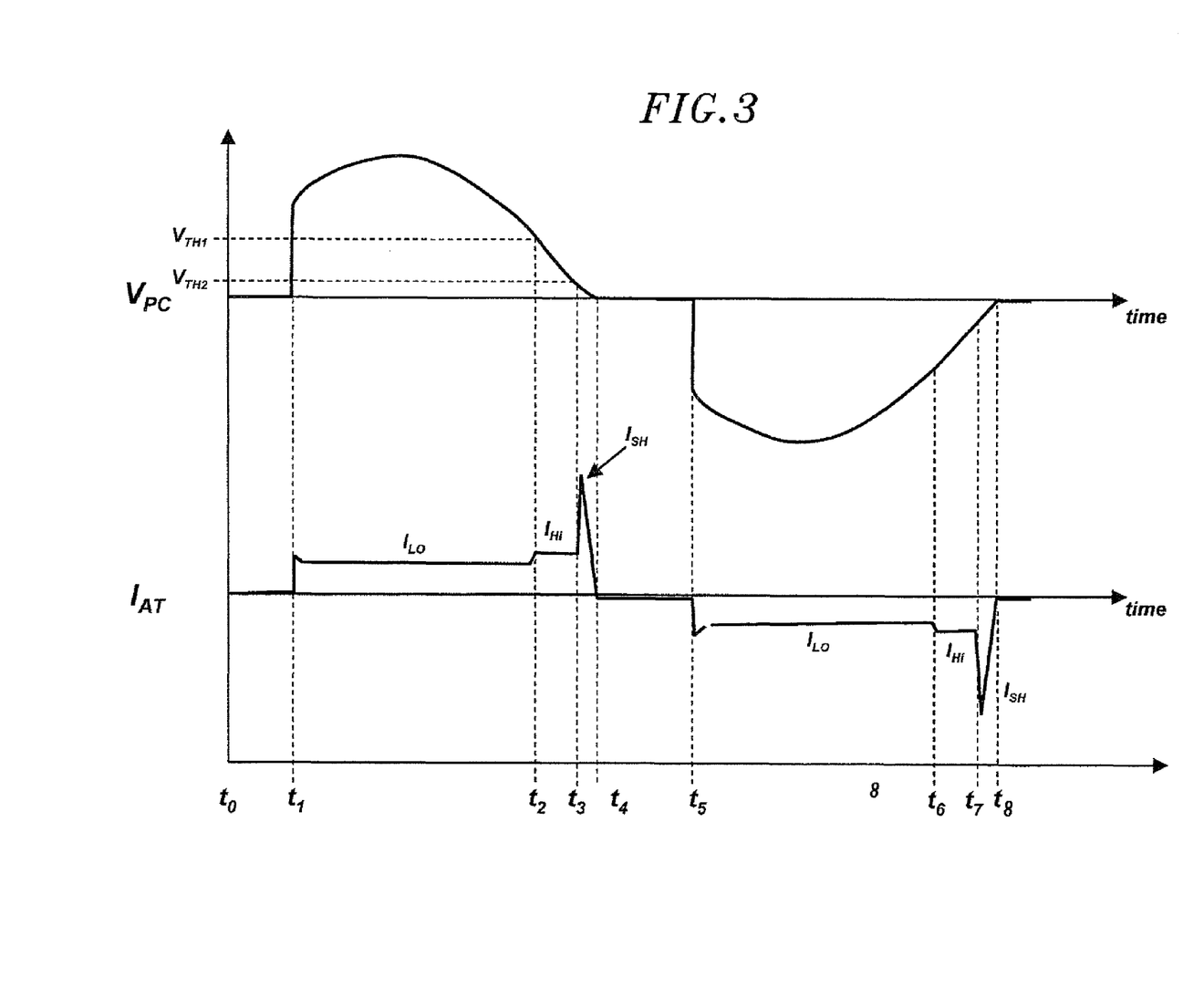
FIG. 3 is a timing chart of the current adjusting circuit of the first embodiment.

As shown in FIG. 3, the triac T is turned off during a time period between a time point $T_0$ and a time point $T_1$. The triac T is turned on at the time point $T_1$, so that the voltage $V_{PC}$ is increased to be equal to or greater than the zener voltage (threshold value $V_{TH2}$) of the zener diode D8 and the zener voltage (threshold value $V_{TH1}$) of the zener diode D4. Here, the threshold value $V_{TH2}$ is smaller than the threshold value $V_{TH1}$. When the voltage $V_{PC}$ reaches the threshold value $V_{TH1}$ or higher, the transistor Q2 is turned on and, thus, the transistor Q1 is turned off. As a result, no current flows through the resistor R20 and a small amount of current flowing through the resistor R14 flows through the resistor R12.

When the voltage $V_{PC}$ reaches the threshold value $V_{TH2}$ or higher, the transistor Q4 is turned on and, thus, the MOSFET M1 is turned off. As a result, there flows no current through the resistor R16. Further, the transistor Q2 is delayed to be turned on slightly due to the presence of a delay circuit including the resistor R22 and the capacitor C20. The delay circuit serves to prevent the malfunction caused by a ringing current generated at the instant when the triac T is turned on. By designing the delay circuit depending on a ringing generating time period, it is possible to reliably turn on the triac T.

During the time period between the time point $t_1$ and a time point $t_2$, the OFF states of the transistor Q1 and the MOSFET M1 are maintained, and the current of the resistor R12 is kept at a set current $I_{LO}$ of low level. When the voltage $V_{PC}$ is decreased to become lower than the threshold value $V_{TH1}$ at the time point $t_2$, the transistor Q2 is turned off and, thus, the transistor Q1 is turned on. As a result, a current of the resistor R20 is generated via the transistor Q1, so that the current of the resistor R12 is increased. Accordingly, the input current $I_{AT}$ becomes a current $I_{HI}$. During the time period between a time point $t_3$ and a time point $t_4$ when the voltage $V_{PC}$ is decreased to become lower than the threshold value $V_{TH2}$, the transistor Q4 is turned off and, thus, the MOSFET M1 is turned on. As a result, a current $I_{SH}$ is generated at the resistor R16.

A circuit operation during the time period between a time point $t_5$ and a time point $t_8$ is the same as that during the time period between the time point $t_1$ and the time point $t_4$, and thus redundant description thereof will be omitted herein.

During the OFF period of the triac T, the MOSFET M1 is temporarily is on due to the delay circuit of the resistor R19 and the capacitor C21. By making the delay time of the delay circuit of the resistor R19 and the capacitor C21, it is possible to render the MOSFET M1 to maintain the ON state during the whole OFF period of the triac T.

As described above, in accordance with the illumination apparatus 10 of the first embodiment, it is possible to set a current in the ON state of the triac T to be equal to or greater than a predetermined value regardless of the number of load circuits. This makes it possible to reduce a standby power.

In accordance with the illumination apparatus 10 of the first embodiment, it is also possible to provide a simpler circuit configuration as compared with the circuit configuration in which a holding current circuit is provided for each of the load circuits PS1, PS2 and PS3. This makes it possible to reduce a manufacturing cost.

In accordance with the illumination apparatus 10 of the first embodiment, the input current of the current control circuit 14 is adjusted stepwise depending on the voltage of the AC power source during the ON state of the triac T such that the current is reduced when the voltage is increased. Accordingly, it is possible to reduce a loss of the constant current circuit 16.

In accordance with the illumination apparatus 10 of the first embodiment, it is also possible to supply a sufficient power source voltage to a driving circuit of the triac T during the OFF state of the triac T.

Second Embodiment

Next, an illumination apparatus 30 in accordance with a second embodiment of the present invention will be described.

Further, in the following description and drawings, components, having substantially the same configuration and function are denoted by like reference characters, and thus redundant description thereof will be simplified or omitted herein.

Figure 4:
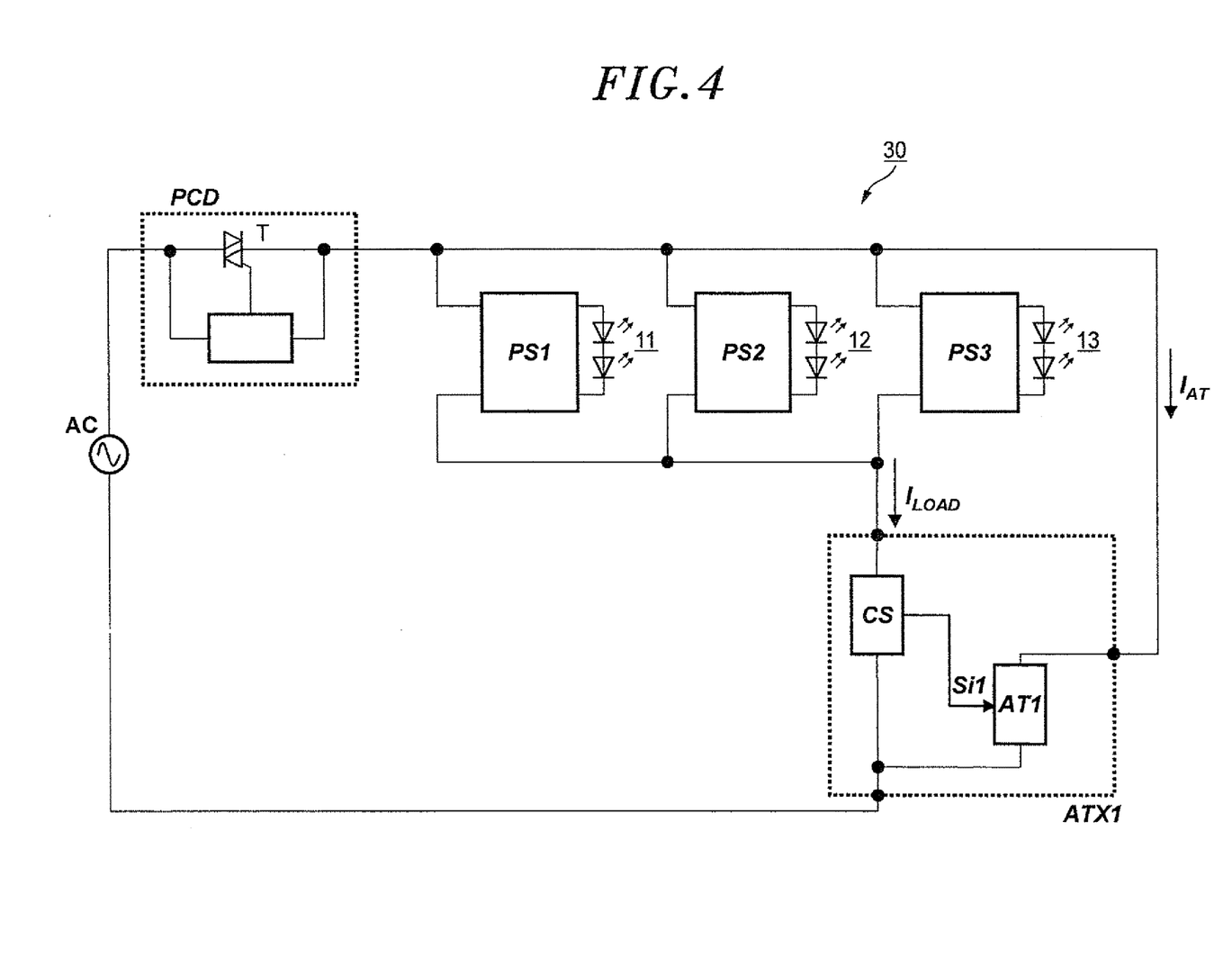
FIG. 4 is a block diagram showing an illumination device in accordance with a second embodiment of the present invention.

As shown in FIG. 4, the illumination apparatus 30 of the second embodiment includes a current adjusting unit ATX1 having the current adjusting circuit AT1 and a load circuit current detecting unit CS connected to the current control circuit AT1 to serve to detect a load current. A current $I_{LOAD}$ of at least one of the load circuits PS1, PS2 and PS3 is inputted into the load circuit current detecting unit CS of the current adjusting circuit AT1. When a load current is detected, the load circuit current detecting unit CS transmits a detection signal Sit representing the detected load current level to the current adjusting circuit AT1.

The current adjusting circuit AT1 adjusts an input current depending on the detection signal Sit. For example, the current adjusting circuit AT1 may increase or decrease an emitter current of the transistor Q3 in the constant current circuit 16 of the first embodiment in inverse proportion to the detected load current level. In this case, when there flows a large load current, it is possible to reduce the input current of the current adjusting circuit AT1, thereby decreasing a power loss of an illumination system.

In accordance with the illumination apparatus 30 of the second embodiment, it is possible to reduce a current consumption and power loss by providing the load circuit current detecting unit CS when a large number of load circuits are connected.

Third Embodiment

Figure 5:
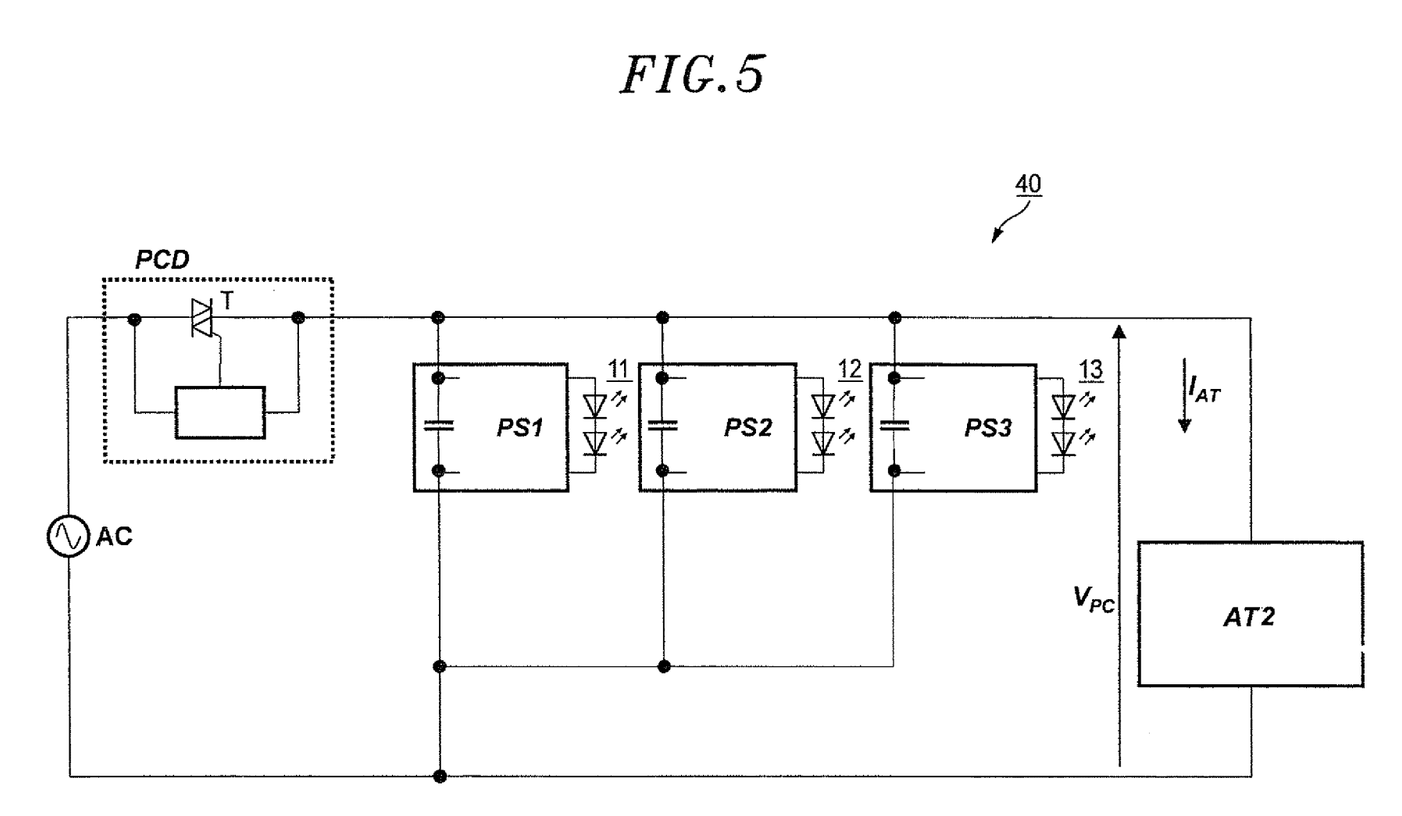
FIG. 5 is a block diagram showing an illumination device in accordance with a third embodiment of the present invention.

Next, an illumination apparatus 40 in accordance with a third embodiment of the present invention will be described. As shown in FIG. 5, the illumination apparatus 40 of the third embodiment includes a current adjusting circuit AT2.

Figure 6:
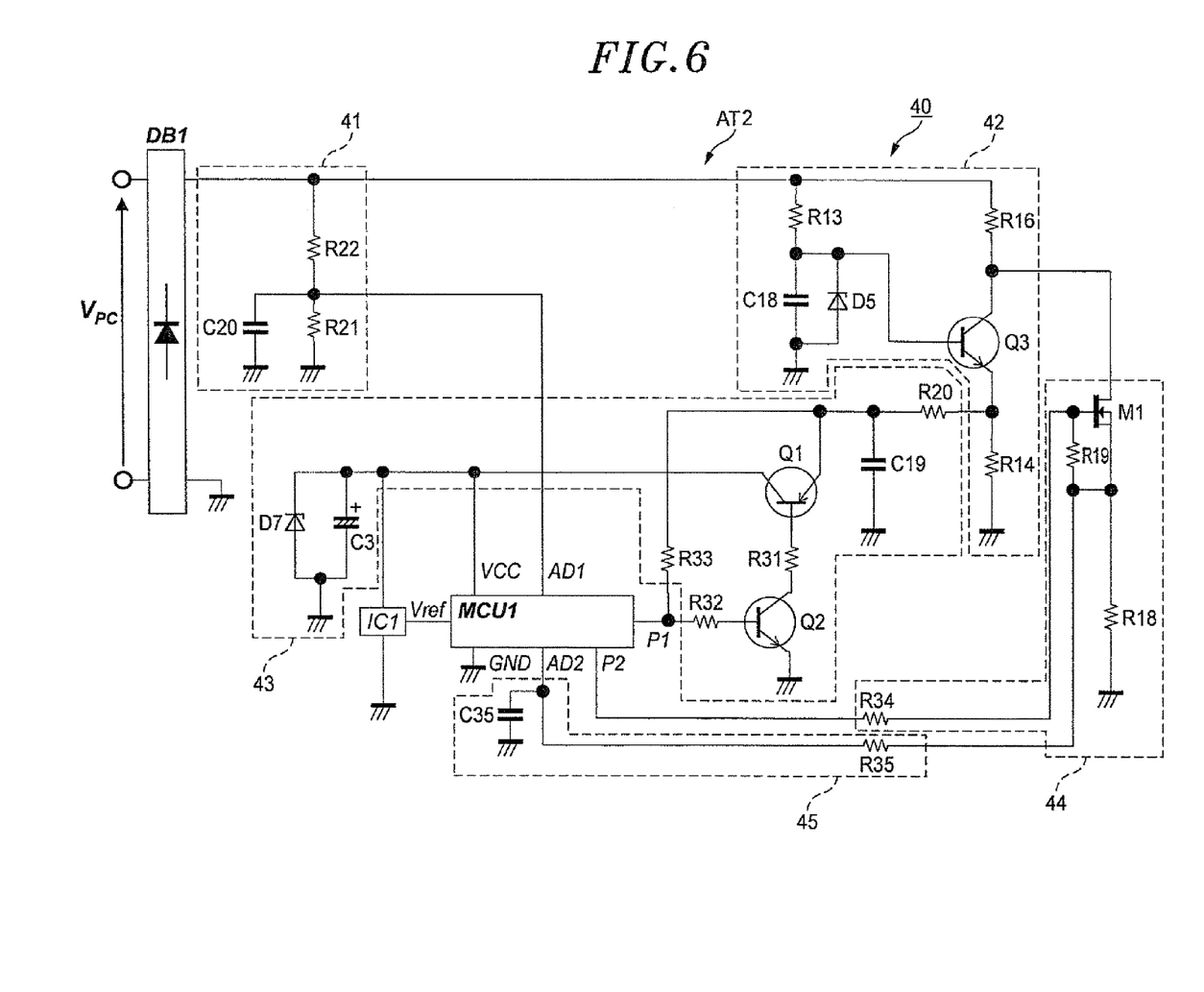
FIG. 6 is a circuit diagram showing a current adjusting circuit of the illumination apparatus of the third embodiment.

The current adjusting circuit AT2, as shown in FIG. 6, includes a diode bridge DB1; a microcomputer MCU1; a reference voltage generating circuit IC1; and an input voltage detecting circuit 41. The current adjusting circuit AT2 further includes a constant current circuit 42; a control power source circuit 43; a resistor short-circuiting switch circuit 44; and a short-circuit current detecting circuit 45. The reference voltage generating circuit IC1 serves to supply a reference voltage $V_{REF}$ to an A/D converter (not shown) included in the microcomputer MCU1. For that reason, although the voltage $V_{CC}$ is slightly varied, a converted result of the A/D converter is stabilized. The input voltage detecting circuit 41 includes resistors R22 and R21; and a capacitor C20, and serves to transmit an input voltage to an A/D input port AD1 of the microcomputer MCU1 after full wave rectification.

A low pass filter is provided by adding the capacitor C20 to a voltage dividing circuit including the resistors R21 and R22. Since it is necessary to detect variation in the power source voltage by the microcomputer MCU1, a cutoff frequency is set to be higher than two times a power source frequency. The cutoff frequency is set as, e.g., about 3 kHz.

The constant current circuit 42 includes a resistor R13; a capacitor C18; a zener diode D5; a transistor Q3; and resistors R16 and R14. The control power source circuit 43 includes resistors R20, R33, R32 and R31; a capacitor C19; transistors Q1 and Q2; a zener diode D7; and a capacitor C3.

In the constant current circuit 42, a base voltage of the transistor Q3 is determined by the zener diode D5 so that an emitter voltage of the transistor Q3 is made substantially constant. Then, the current of the resistor R16 is controlled by determining an output current of an emitter of the transistor Q3 by the resistors R14 and R20 and the transistor Q1.

An emitter current of the transistor Q1 is controlled by a switching circuit including the resistors R31 and R32 and the transistor Q2. The switching circuit is controlled to be turned on or off by an output port P1 of the microcomputer MCU1. For example, the output from the output port P1 of the microcomputer MCU1 is a PWM output, and the emitter current of the transistor Q1 can be easily controlled by varying an on duty ratio of the PWM output.

A collector of the transistor Q1 is connected to the capacitor C3. Accordingly, when the transistor Q1 is turned on, the capacitor C3 is charged through the resistor R16, the transistor Q3, the resistor R20 and the transistor Q1. Therefore, a power is supplied to the microcomputer MCU1 and the reference voltage generating circuit IC1. The voltage of the capacitor C3 is restricted to a constant value by the zener diode D7.

The resistor short-circuiting switch circuit 44 includes a resistor R19; a MOSFET M1; and resistors R18 and R34, and is connected in parallel between the collector and the emitter of the transistor Q3. In the resistor short-circuiting switch circuit 44, the MOSFET M1 is controlled to be turned on or off depending on a signal transmitted via the resistor R34 from a port P2 of the microcomputer MCU1.

The short-circuit current detecting circuit 45 includes a resistor R35 and a capacitor C35. When the MOSFET M1 of the resistor short-circuiting switch circuit 44 is turned on, a current flows through the resistor R18 and, thus, a voltage is generated across the resistor R18. A voltage detected across the resistor R18 is inputted to an A/D converter input port AD2 of the microcomputer MCU1 through a low-pass filter of the resistor R35 and the capacitor C35.

The current adjusting circuit AT2 performs a constant current control depending on an amount of a current flowing during an ON state of the resistor short-circuiting switch circuit 44. In the current adjusting circuit AT2, when a power is supplied, the constant current circuit 42 is operated so that a voltage is outputted to the resistor R14. Since a base of the transistor Q2 is biased by the resistor R33, the transistor Q2 is turned on and, thus, the transistor Q1 is turned on. As a result, the capacitor C3 is charged so that the voltage $V_{CC}$ immediately reaches up to a voltage restricted by the zener diode D7. When the voltage $V_{CC}$ reaches, e.g., several voltages, the microcomputer MCU1 starts to operate.

The microcomputer MCU1 performs A/D conversion in a period that is much shorter than a period of the AC power source AC. A power source input voltage is detected through a port AD1 of the microcomputer MCU1. For example, the two threshold voltages $V_{TH1}$ and $V_{TH2}$ as in the first embodiment are detected by using the power source input voltage inputted to the port AD1.

The microcomputer MCU1 controls an inrush current of the transistor Q1 and the current of the resistor R16 by adjusting the PWM output at the output port P1 based on the power source input voltage detected through the port AD1. A frequency of the PWM output is much higher than a cutoff frequency of a low pass filter including the resistor R20 and the capacitor C19. Further, the cutoff frequency of the low pass filter is higher than two times the power source frequency. For example, the cutoff frequency is set as 1 kHz and the PWM frequency is set as 50 kHz. The constant current circuit 42 is controlled by using the PWM signal from the output port P1, and the resistor short-circuiting switch circuit 44 is controlled by using the signal from the port P2. That is, when the voltage $V_{PC}$ is decreased to become less than the threshold value $V_{TH2}$, the port P2 is set to be the high level so that the MOSFET M1 is turned on as in the first embodiment.

The current detecting resistor R18 is connected to a source of the MOSFET M1. When the signal of high level is outputted from the port P2, the A/D conversion on the port AD2 is performed so that the voltage detected across the resistor R18 is continuously inputted to the microcomputer MCU1. Based on the detected voltage of the resistor R18, a connection state of load is detected.

With input capacitance of loads, as the number of connected loads is increased, a short-circuit current of the MOSFET M1 tends to be decreased. By adjusting PWM output of the output port P1 in accordance with the decrease in the short-circuit current of the MOSFET M1, it is possible to reduce an input current of the constant current circuit 42. In this case, the microcomputer MCU1 serves as a load current detecting unit which monitors the input current of the resistor short-circuiting switch circuit 44 to thereby adjust a current flowing through the constant current circuit 42 depending on the monitored input current of the resistor short-circuiting switch circuit 44.

Further, it is possible to determine whether or not the triac dimmer PCD is turned on based on the voltage $V_{PC}$ during the ON state of the MOSFET M1. Besides, it is possible to determine the type of the triac dimmer PCD based on a current flowing through the MOSFET M1. For example, in the case of a dimmer including a general RC circuit and a diac, there flows hardly any current into the MOSFET even when the MOSFET is turned on during an OFF period of the triac. This is because current consumption of a trigger circuit included in the dimmer is low in a triac dimmer of a pulse trigger type.

On the other hand, in the case of a continuous trigger type triac dimmer in which a trigger current is continuously supplied to a gate of the triac T during an ON state of the triac T, it is necessary to reserve a sufficient trigger power during the OFF period of the triac T. For that reason, a relatively large amount of current flows in the MOSFET M1 during the OFF period of the triac T.

Accordingly, it is possible to determine which type the triac dimmer PCD is by detecting whether or not there presents a relatively large amount of current. In this way, by determining which type the triac dimmer PCB is, it is possible to optimize the stabilizing operation. Specifically, in the case of a pulse trigger type, the constant current circuit 42 is operated such that a current flows during the ON period of the triac T to secure a holding current. In contrast, in the case of the continuous trigger type, the holding current required to maintain the ON state of the triac is supplied by the continuous trigger signal and, thus, the current flowing through the constant current circuit 42 and the resistor short-circuiting switch circuit 44 may be reduced or set to zero, thereby decreasing the power consumption of the whole system. Further, the constant current circuit 42 may be controlled to flow a constant current therethrough during the whole or a part of the "ON" period of the triac T.

Moreover, by regularly monitoring an input voltage by using the microcomputer MCU1, it is possible to detect a malfunction in the triac T. Specifically, when the triac T malfunctions and thus is turned off, zero voltages of the input voltage are generated more frequently than expected from the input AC frequency. Further, when the triac T is not turned off due to a high frequency current noise, there may be detected a signal component having a lower frequency than that of the AC power. In these cases, it is possible to control the triac T to be stabilized by increasing a current level of the constant current circuit 42.

In accordance with the illumination apparatus 40 of the third embodiment, when a large number of load circuits are connected, it is possible to reduce the current consumption, thereby decreasing the power loss.

In accordance with the illumination apparatus 40 of the third embodiment, when an OFF period ratio (OFF period/ON period) of the Triac T is not greater than a predetermined value, e.g., the firing phase angle is not greater than 10°, for example, the microcomputer MCU1 treats the illumination apparatus 40 such that 100% of a commercial AC power is applied to the load circuits PS1 to PS3 without using the triac dimmer POD. In such a case, therefore, the microcomputer MCU1 stops the operation of the constant current circuit 42 and resistor short-circuiting switch circuit 44, so that no current flows therethrough to reduce the power loss.

In accordance with the illumination apparatus 40 of the third embodiment, it is also possible to optimize the stabilizing operation, thereby reducing the power consumption of the whole system, by determining which type the triac dimmer is.

In accordance with the illumination apparatus 40 of the third embodiment, it is also possible to adjust an inrush current of constant current circuit 42 depending on the state of the load voltage by using the microcomputer MCU1. This makes it possible to realize the stabilizing operation for various types of triac dimmer.

In accordance with the illumination apparatus 40 of the third embodiment, it is also possible to perform no stabilizing operation in the case that, e.g., the illumination apparatus 40 is directly connected to the commercial power source without employing the triac dimming control.

In accordance with the illumination apparatus 40 of the third embodiment, it is also possible to perform the stabilizing operation by a corrective control when the triac becomes un-stabilized due to a strong noise.

In the illumination apparatus of the above embodiments of the present invention, LEDs, diode bridges, load circuits and other units are not limited to those in the respective embodiments. Adequate modifications and improvements may be applied to the units.

While the invention has been shown and described with respect to the embodiments, it will be understood by those skilled in the art that various changes and modifications may be made without departing from the scope of the invention as defined in the following claims.

What is claimed is:

1. An illumination apparatus comprising:
    a series circuit of a thyristor and at least one load circuit connected across an AC power source; and
    a current adjusting circuit includes a current control circuit and a short circuit, the current adjusting circuit being connected in parallel to the load circuit,
    wherein the current control circuit is configured to adjust an input current applied to the current adjusting circuit to be maintained at a predetermined level during a part or the whole of an ON period of the thyristor,
    wherein the short circuit is configured to short-circuit input ports of the load circuit to have a predetermined resistance during a part of the ON period of the thyristor and a part or the whole of an OFF period of the thyristor,
    wherein a short-circuit current is generated such that the input current is increased when the input ports of the load circuit are short-circuited by the short circuit, and
    wherein the input current of the current adjusting circuit is adjusted stepwise depending on a voltage of the AC power source during the ON period of the thyristor.

2. The illumination apparatus of claim 1, further comprising a load current detecting unit for detecting an input current of said at least one load circuit,
    wherein the input current of the current adjusting circuit is adjusted depending on a detected result of the load current detecting unit.

3. The illumination apparatus of claim 2, wherein the input of the current adjusting circuit is adjusted by changing an input current applied to the short circuit.

4. The illumination apparatus of claim 1, wherein the illumination apparatus further comprises a microcomputer and when the microcomputer detects that an off period ratio of the thyristor is equal to or smaller than a predetermined value, the microcomputer stops the operations of the current control circuit and the short circuit are stopped.

5. The illumination apparatus of claim 1, wherein operations of the current control circuit and the short circuit are controlled based on a gate driving type of the thyristor determined by a current of the short circuit.

* * * * *